(12) United States Patent
Taber et al.

(10) Patent No.: US 6,964,346 B1
(45) Date of Patent: Nov. 15, 2005

(54) CLOSURE CAP WITH INJECTION MOLDED ANNULAR GASKET AND METHOD OF MAKING SAME

(75) Inventors: James Taber, Aurora, IL (US); Stephen B. Kras, Chicago, IL (US)

(73) Assignee: White Cap, Inc., Downers Grove, IL (US)

( * ) Notice: Subject to any disclaimer, the term of this patent is extended or adjusted under 35 U.S.C. 154(b) by 545 days.

(21) Appl. No.: 09/634,182

(22) Filed: Aug. 9, 2000

(51) Int. Cl.[7] ............................................. B65D 53/00
(52) U.S. Cl. ..................... 215/352; 215/252; 215/341; 215/343; 264/268
(58) Field of Search ................ 215/252, 352, 215/341, 343–345; 264/268, 266

(56) References Cited

U.S. PATENT DOCUMENTS

| | | | | |
|---|---|---|---|---|
| 3,550,987 A | * | 12/1970 | Dickey | |
| 3,689,625 A | * | 9/1972 | Zipper | |
| 4,311,317 A | * | 1/1982 | Bartels | .................... 220/378 X |
| 4,697,716 A | * | 10/1987 | Mumford | .................... 215/352 |
| 5,021,515 A | * | 6/1991 | Cochran et al. | |
| 5,685,443 A | * | 11/1997 | Taber et al. | ................. 215/252 |
| 5,728,484 A | * | 3/1998 | Yamaguchi et al. | |
| 5,839,592 A | * | 11/1998 | Hayes | |
| 5,989,480 A | * | 11/1999 | Yamazaki | .................... 264/153 |
| 6,103,170 A | * | 8/2000 | Gregory | |
| 6,202,871 B1 | * | 3/2001 | Kelly | .......................... 215/350 |
| 6,369,155 B1 | * | 4/2002 | Takita | ......................... 277/910 |
| 6,399,170 B1 | * | 6/2002 | Hock et al. | ................. 215/341 |

FOREIGN PATENT DOCUMENTS

GB 2235184 * 2/1991

* cited by examiner

Primary Examiner—Robin A. Hylton
(74) Attorney, Agent, or Firm—Cook, Alex, McFarron, Manzo, Cummings & Mehler, Ltd.

(57) ABSTRACT

A closure cap and method of making the same wherein an annular or ring-shaped gasket is injection molded onto the inner surface of a cap shell formed of plastic or metal. The annular or ring-shaped gasket includes radially extending tabs integrally formed therewith, one of said tabs being formed at a location wherein the plastic melt is fed to an annular gasket-forming channel in a mold core and another of said tabs being formed at the location wherein plastic melt is discharged from said channel. Preferably, said other tab includes a cold well formation which communicates with the annular gasket through a connecting portion of reduced cross-sectional area with respect to the cross-sectional areas of both the gasket and the cold well formation.

24 Claims, 7 Drawing Sheets

CLOSURE CAP WITH INJECTION MOLDED ANNULAR GASKET AND METHOD OF MAKING SAME

BACKGROUND OF THE INVENTION

The present invention generally relates to new and useful improvements in closure caps for glass and plastic containers and, more particularly, to a closure cap having an improved injection molded annular gasket and method of making the same. In this regard, an important aspect of the present invention is directed to a closure cap having a one-piece or unitary cap shell formed of a polyolefin such as, for example, polypropylene, in which an annular or ring-shaped gasket characterized by improved uniformity, definition and consistency which is composed of a moldable resin such as, for example, a thermoplastic elastomer, is injection molded onto the inner surface of the closure cap shell via an insert molding procedure.

Closure caps having full disks formed by compression or injection molding the same in a closure shell are known. For example, U.S. Pat. No. 4,398,874 describes a molding tool for forming a full disk liner in a closure shell which includes a central punch or molding member and a shell positioning sleeve disposed externally of the molding member that is received within a cap shell. Liner material deposited within the shell is contacted by the punch and forms a full disk liner with the cap shell. Correspondingly, U.S. Pat. No. 4,803,031 describes a closure cap and method wherein an injection molded full disk gasket is formed followed by injection molding the closure cap shell around the thus formed gasket. These full disk closure caps while providing generally satisfactory sealing on containers are characterized by higher manufacturing costs associated with using greater amounts of gasket-forming resin and also by the disadvantages of having the entire inside surface of the cap shell fully covered thereby increasing the possible migration of gasket components into product (particularly food products) in the container sealed therewith and also making the inner surface of the cap shell unavailable for displaying labels or other message-conveying indicia.

U.S. Pat. No. 5,685,443 describes a composite closure cap where an annular gasket providing a top and side seal is injection molded onto a metal disk followed by injection molding a plastic skirt around the disk in surrounding and capturing relation therewith. This composite closure while utilizing an injection molded annular gasket requires the presence of a separate disk which adds to the cost of the closure and to the complexity of manufacturing the same.

SUMMARY OF THE INVENTION

The present invention overcomes the foregoing disadvantages of these prior art closures by providing a novel closure utilizing a plastic or metal cap shell and an injection molded annular or ring-shaped gasket wherein the central portion of the inner surface of the cap shell is free of gasket material.

In accordance with an important aspect of the present invention, an improved closure cap is provided which includes a unitary or one-piece plastic or metal shell and an annular ring-shaped gasket having inwardly radially extending tabs integrally formed therewith, one of said tabs being formed at the location wherein plastic melt is fed to an annular gasket-forming channel in a mold core and the other of said tabs being formed at the location wherein plastic melt is discharged from said channel. The latter of said tabs, in accordance with a preferred embodiment of the present invention, includes a cold well which communicates with the annular gasket forming channel through a passageway of reduced cross-sectional area with respect to the cross-sectional areas of both the gasket forming channel and the cold well.

It is, therefore, an object of the present invention to provide an improved closure cap having a novel injection molded annular gasket and method of making the same.

Another object of the present invention is to provide a closure cap having a one-piece plastic or metal shell and an injection molded top seal annular gasket which utilizes a cost-effective amount of moldable, gasket-forming material and which provides an efficient seal with the end finish of a container to which the closure cap is applied.

Another object of the present invention is to provide an injection molded annular gasket formed by insert molding the same in a one-piece closure cap shell wherein the uniformity and consistency of the gasket is enhanced which gasket is characterized by integral radially extending tabs at locations along the periphery of the gasket corresponding to the locations wherein the melt is supplied to and from a gasket defining channel.

These and other objects of the present invention will be apparent from the following detailed description taken in conjunction with the accompanying drawings wherein like reference numerals refer to like parts and in which:

DETAILED DESCRIPTION OF THE INVENTION

Referring to the drawings and with particular reference to FIGS. 1–4, a closure cap embodying the present invention is generally designated by the reference numeral 20. As shown, closure cap 20 is applied to a container 21 and includes an end panel 22 having an inner or bottom surface 23, a skirt 24 which terminates in an enlarged axially extending cylindrical section 25.

Figure 1:
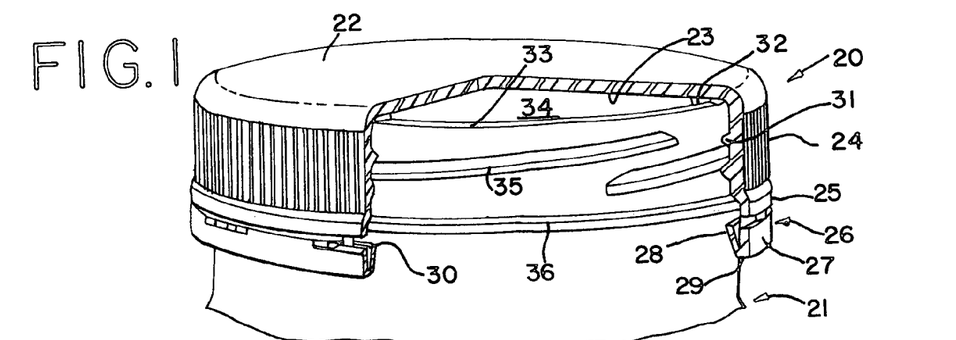
FIG. 1 is a perspective view, partially broken away, of a closure cap embodying the present invention and a portion of a container on which the closure is fitted.
Figures 2, 3:
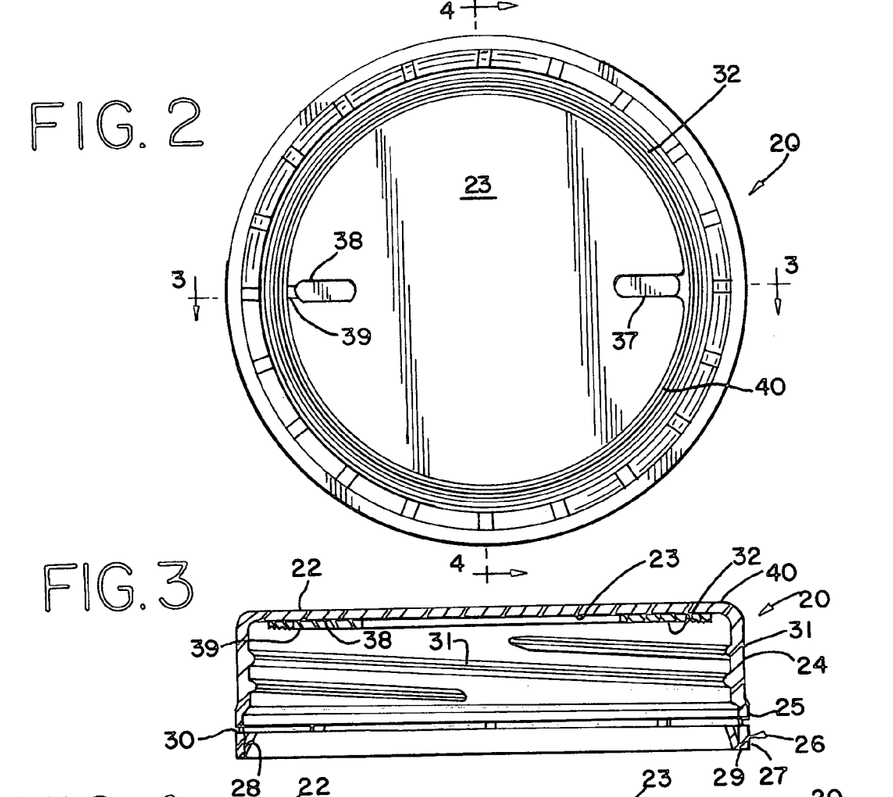
FIG. 2 is a bottom plan view of the closure cap shown in FIG. 1.
FIG. 3 is a sectional view of the closure cap shown in FIGS. 1 and 2 taken along the line 3—3 of FIG. 2.
Figure 4:
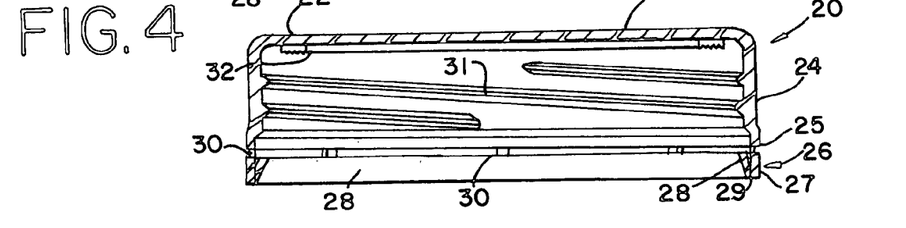
FIG. 4 is a sectional view of the closure cap shown in FIGS. 1 and 2 taken along the line 4—4 of FIG. 2.

As best shown in FIGS. 1, 3 and 4, bottom cylindrical section 25 is, in the illustrated embodiment, connected to a tamper indicating band 26 by a plurality of frangible bridges which includes an upper band portion 27 and a lower band portion 28 which are connected by a flexible hinge 29. Closure cap 20 is provided with a spiral thread 31 on the interior surface of skirt 24, however, it will be appreciated that other container-engaging securement systems such as, for example, conventional lugs and the like may be used without departing from the present invention. Correspondingly, the closure cap can be made with other forms of tamper indicating bands or, if desired, without any such band.

In accordance with an important aspect of the present invention, closure cap 20 includes an injection molded annular or ring-shaped gasket 32 positioned around the outer periphery of the inner or bottom surface 23 for top-seal engagement with an end finish or top edge 33 of container 21 which defines an open mouth 34 of the container. As shown in FIG. 1, container 21 includes a spiral thread 35 sized to matingly engage thread 31 on closure cap 20 and also includes a retainer bead 36 for engagement with the bottom edge of lower tamper indicating band portion 26 in a manner which is well known in the art.

Annular or ring-shaped injection molded gasket 32 is provided with an integral radially inwardly extending tab 37 corresponding to the location at which inlet melt feed is supplied to the mold cavity during the injection molding process and a cold well tab 38 and connector portion 39 which also are integral with the gasket 32 and which correspond to the location at which melt is discharged from the mold cavity defining the gasket. The precise manner in which these respective tabs are formed will be more fully described in connection with the mold apparatus.

In accordance with another aspect of the described embodiment of the present invention, the top surface 40 of gasket 32 is provided with a plurality of V-shaped ribs that provide improved seal-forming contact with the closure finish. It is important to note that the formation of these V-shaped ribs via injection molding gives them significantly better definition than that attainable by other manufacturing procedures, such as, for example, compression molding. In this regard, however, it will be appreciated that, if desired, the top surface 40 of gasket 32 can be flat or of other configurations.

Closure cap 20, in accordance with the present invention, is made of suitable moldable polyolefin such as, for example, polypropylene and homopolymers and copolymers thereof. In this regard, however, it will be appreciated that other suitable moldable plastic resins may be used in forming the closure cap. Alternatively, if desired, the injection molded annular gasket of the present invention may also be incorporated in metal closures.

Annular or ring-shaped gasket 32 may likewise be formed of any resilient or elastomeric materials which provide the desired seal with a container finish, however, vinyl chloride-free resins or non-PVC materials are preferred. If desired, suitable additives such as those providing improved oxygen barrier and/or oxygen scavenger properties, as well as those which facilitate torque release may be incorporated into the gasket composition.

These non-PVC materials include rubbery block copolymers dispersed in a matrix of polyolefin as the continuous phase, with a moldable thermoplastic elastomer being especially preferred since they possess a number of processing advantages. Gasket compositions which can be effectively used include those composed of a thermoplastic elastomeric material selected from a moldable-saturated ABA-type block copolymer based on styrene and butadiene such as styrene-ethylene-butylene styrene (SEBS) type block copolymers containing from about 20% to about 40% styrene and about 60% to 80% ethylene-butylene co-monomers such as Kraton® G-2705, available from Shell Chemical Corporation. Preferred thermoplastic elastomers also include the EPDM (ethylene-propylene-dicyclopentadiene) elastomers such as those commercially available under the trade name Santropene® from Monsanto Company. Other suitable thermoplastic elastomers are those which are available from Advanced Elastomer Systems, L.P. of Akron, Ohio.

A suitable apparatus for manufacture of the closures of the present invention is generally depicted in FIGS. 5–12. FIGS. 5–9 schematically depict a mold apparatus having a feed system for supplying preformed closure cap shells to the molding station wherein the injection molded gasket is formed via insert molding procedures. It will be appreciated that while a specific transport mechanism is described herein for supplying closure cap shells to the mold apparatus and for transportation of such closure caps through and from that apparatus, other transport feeding systems such as, for example, belt and/or robotic closure cap transportation arrangements, could be used if desired. A common feature of all molding systems which is important to the present invention, however, concerns the precise insert molding arrangement by which annular or ring-shaped gaskets are formed with exceptional preciseness in their configuration and without air entrapment.

Figure 5:
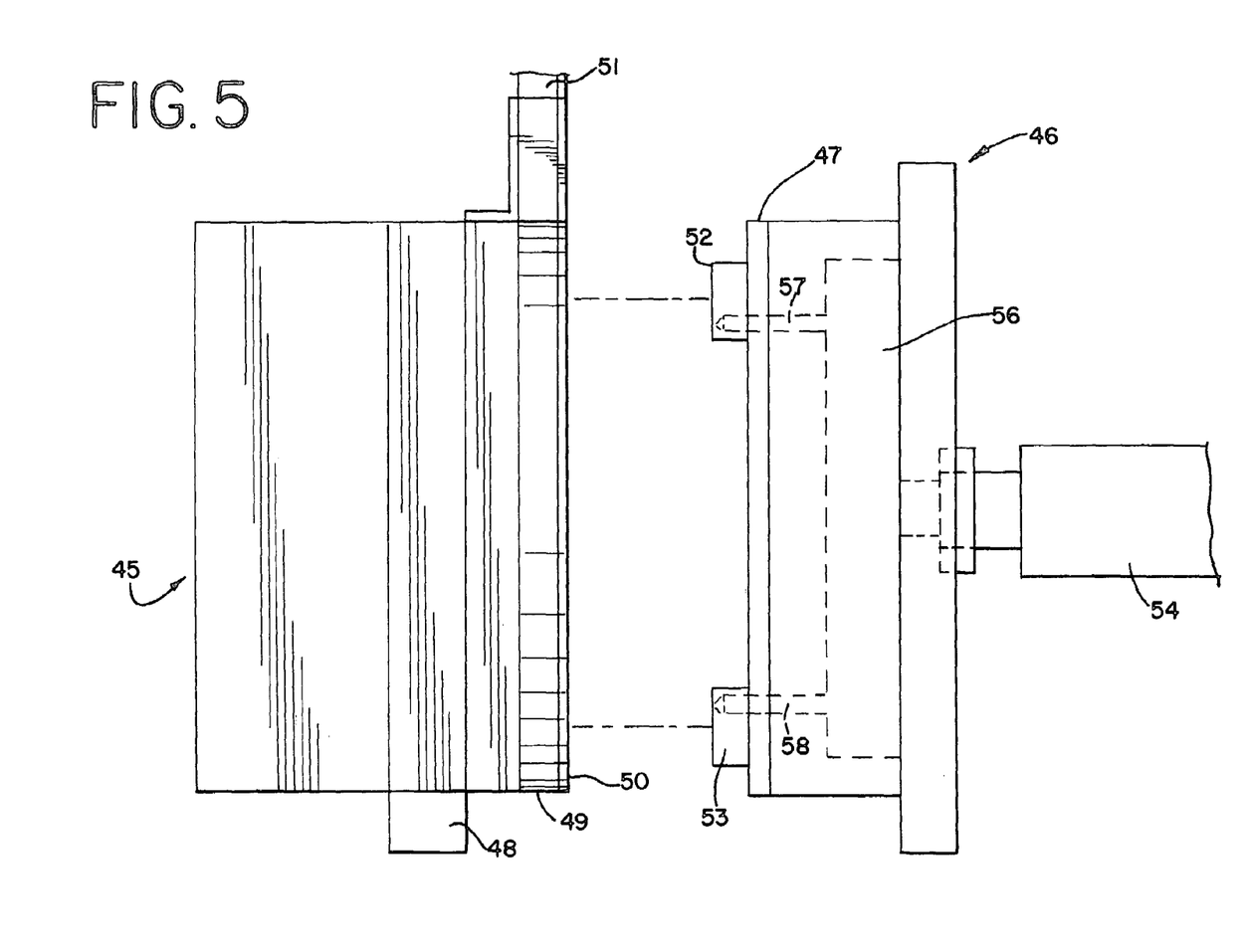
FIG. 5 is a schematic side elevation view of a mold apparatus which can be used to manufacture the closure cap of the present invention.

As generally shown in FIG. 5, the molding apparatus includes a moving platen 45, and a stationary platen 46 which comprises a core section 47. Moving platen 45 includes a transfer drive 48, a transfer dial 49, a stripper plate 50 and feed chute 51 which will be more fully described in conjunction with FIGS. 6 and 7.

Correspondingly, the core section 47 schematically shown in FIG. 5 includes individual mold cores 52 and 53. Melt is supplied to the core section 47 from an injection unit 54 which feeds melt to a manifold section 56 that, in turn, supplies pressurized melt feed via line 57 and 58.

Figure 6:
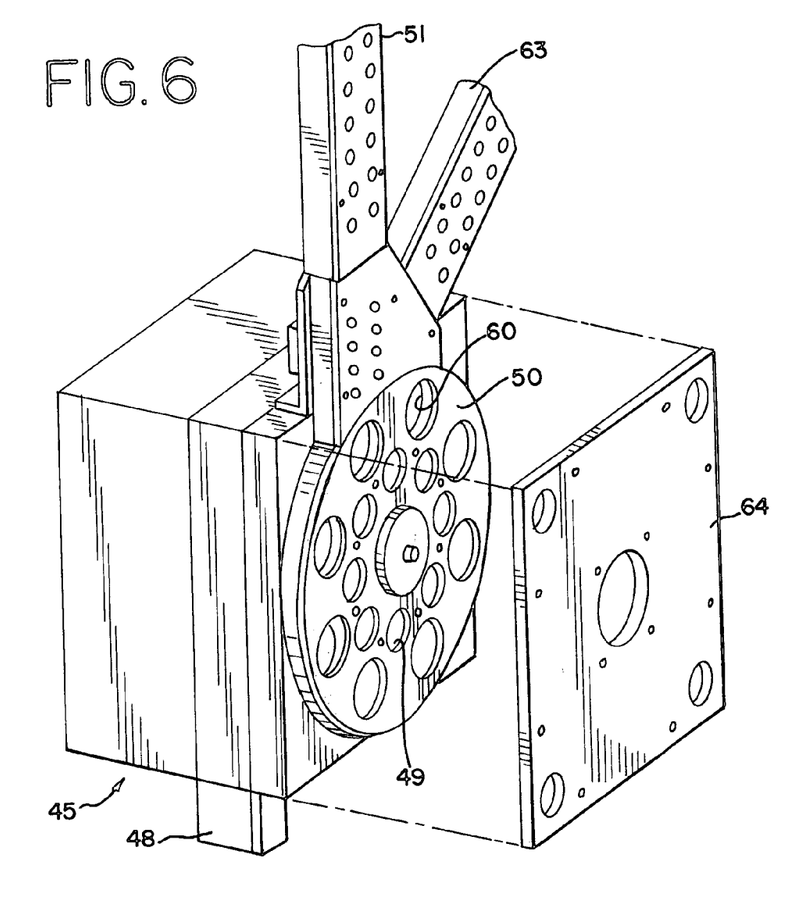
FIG. 6 is a schematic perspective view of a portion of the moving platen of the mold apparatus shown in FIG. 5 which is separated from a core plate of the stationary platen.
Figure 7:
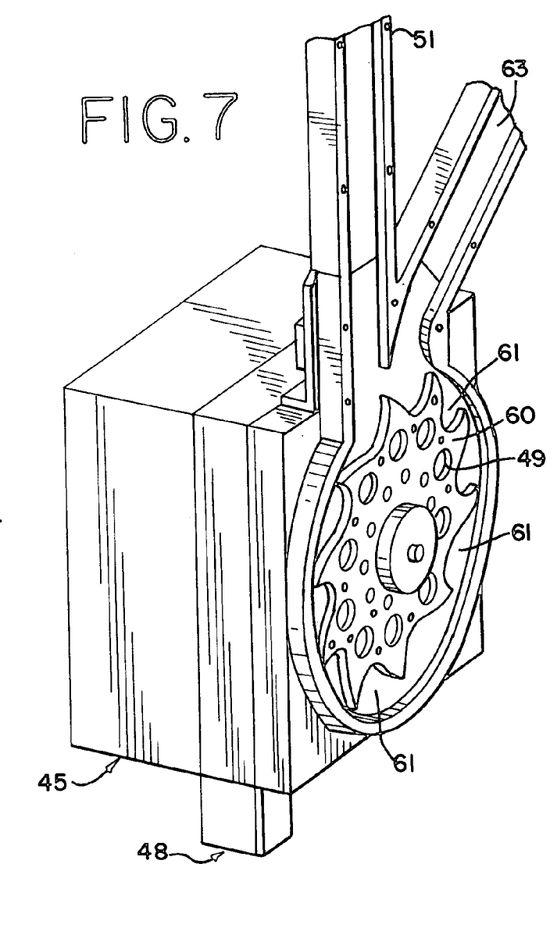
FIG. 7 is a schematic perspective view of the moving platen of the bold apparatus of the present invention with the stripper plate thereof removed.
Figure 8:
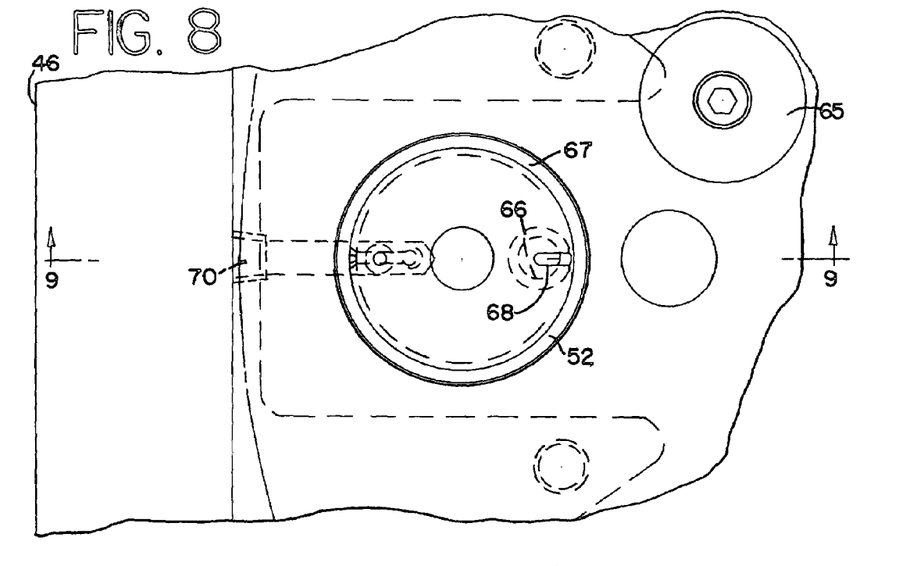
FIG. 8 is a partial top plan view of the mold core of the present invention.
Figure 9:
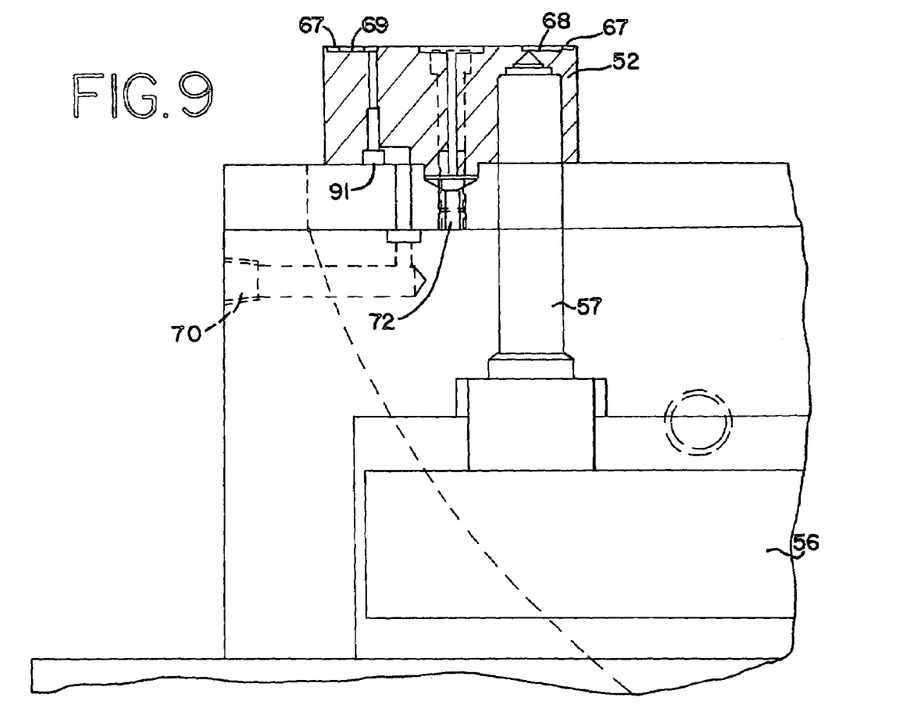
FIG. 9 is a sectional view taken along the line 9—9 of FIG. 8.

As best shown in FIG. 7, moving platen 45 includes a rotatable star wheel transfer mechanism generally depicted by the reference numeral 60 which has ten cap-receiving pockets, each of which is generally designated by the reference numeral 61. As shown, caps are supplied from feed chute 51 into each of the individual pockets 61 until the star wheel is fully loaded. Individual mold cores on mold core section 47 are respectively received within each of the cap shells. After the gasket-forming operation is completed, the mold is opened and the completed closure caps discharge from the moving platen via discharge chute 63. If desired, pressurized air may be used to facilitate loading and removal of the cap shells in the star wheel transfer mechanism. In this regard, it will be appreciated that the number of cap-receiving pockets located in the star wheel can be varied. For example, in the arrangement illustratively depicted in FIG. 7, ten cap-receiving pockets are shown, while eight such pockets are shown in FIG. 6.

Referring to FIG. 6, it will be observed that a core plate 64 is depicted in space-away relationship to the moving platen 46. As will be apparent from the description of FIGS. 8 and 9, the portion of core plate 64 facing moving platen 45 includes a plurality of standoff posts (shown in FIG. 8 and designated by reference numeral 65) which control the depth of penetration of the individual mold cores into each of the closure cap shells.

Referring now to FIGS. 8–12, each of the mold cores (designated by reference numeral 52) is sized to be received within the closure cap shell for direct contact with the inner or bottom surface 23 of end panel 22 of a given closure cap. Melt supplied from manifold 56 and melt feed line 57 is discharged through a gate 66 into an inlet melt feed line 68 and from there into an annular channel 67 which, together with the inner or bottom surface 23 of the closure cap forms a gasket-defining mold cavity. Typically, with plastic enclosure cap shells, the mold cores will penetrate the end panel surface to a limited and controlled extent, while with metal closure cap shells no such penetration is needed in order to achieve effective melt flow shut-off for containment of the melt within the gasket-defining mold cavity. The melt flow from inlet 68 passes in clockwise and counterclockwise directions through the annular channel 67 and is discharged into a cold well portion 73 of the core via a connecting passage 74. In accordance of an important aspect of the present invention, the connecting passage 74 has a reduced cross-sectional configuration to ensure that the meeting melt streams will knit at that location and, additionally, eliminates or at least greatly minimize the trapping of any air in the gasket itself. This reduced size passageway results in a lower pressure on the inside portion of the cold well than is present in the annular gasket-defining portion 67 causing any air present in the melt to be readily discharged into the cold well.

Figure 10:
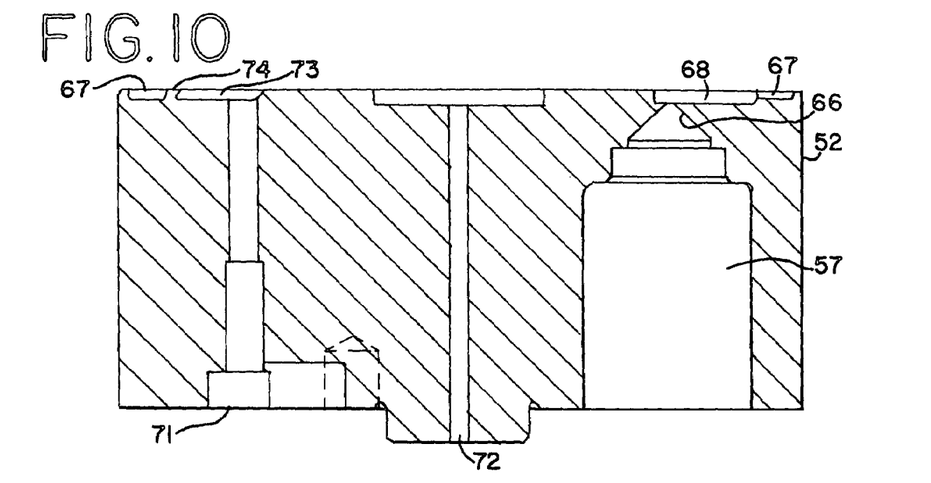
FIG. 10 is a schematic sectional view of the core head of the mold apparatus shown in FIGS. 8 and 9.

As shown, a vent line 71 can be provided to draw a vacuum on the system to further facilitate air removal during the feed of melt. Also, as shown, an air line 72 can be provided to facilitate removal of the finished closure after the injection molding of the gasket has been accomplished and the mold opened. If desired, vent line 71 and air line 72 can be coupled to further facilitate removal of the finished closure when the molding operation is complete.

Heat built up during the injection molding process can be dissipated through the use of water cooling, which can be accomplished by an outlet water line 70 which is in flow communication with an inlet water line (not shown).

Figure 11:
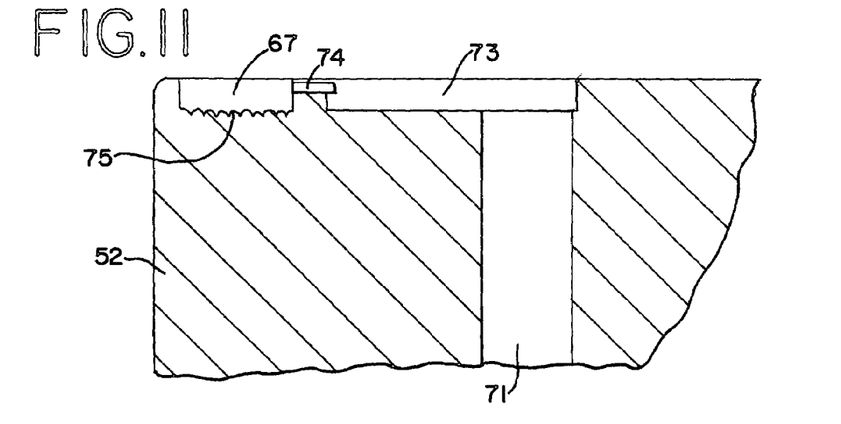
FIG. 11 is an enlarged sectional view of the melt discharge side of the core head shown in FIG. 10.
Figure 12:
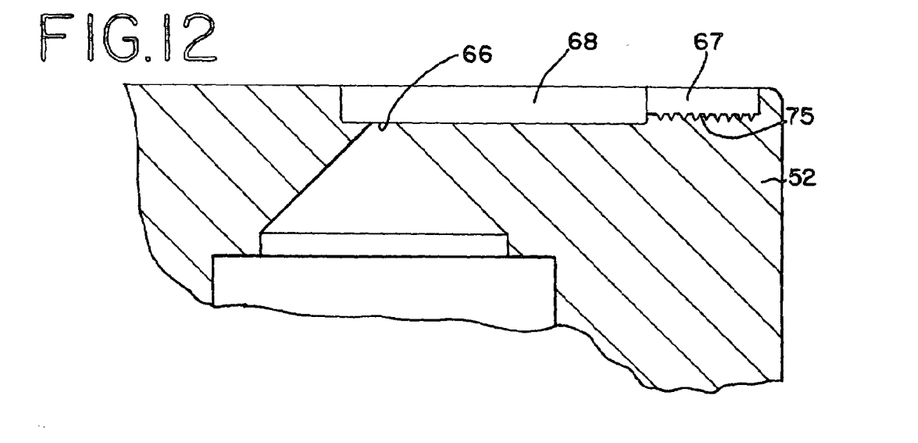
FIG. 12 is an enlarged sectional view of the melt inlet side of the core head shown in FIG. 10.

As best shown in FIGS. 11 and 12, the bottom surface 75 of annular channel 67 is provided with a plurality of V-shaped grooves which form a plurality of concentric V-shaped ribs that impart improve seal-forming contact with the closure finish. As previously noted, the formation of these V-shaped ribs by injection molding process gives them significantly better definition than is achievable by other molding procedures.

Figure 13:
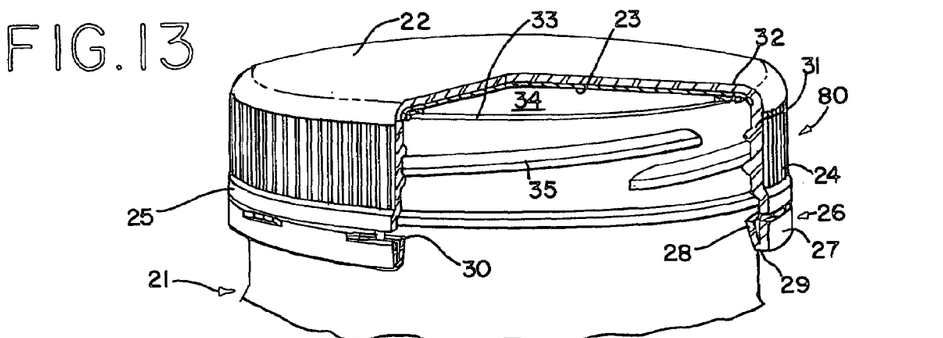
FIG. 13 is a fragmentary perspective view, partially broken away, of the closure cap of another embodiment of the present invention and a portion of a container on which the closure cap is fitted; and, FIGS. 14–18 are schematic views of a mold apparatus for manufacturing the closure cap shown in FIG. 13 with each of the views showing successive phases of the closure shell manufacturing process.

FIG. 13 generally designates a further embodiment of the present invention in the form of a modified closure cap 80 having a layer of metallic foil or other suitable material bonded to the inner surface 23 of end panel 22 and to which the annular or ring-shaped injection molded gasket is bonded. This construction is particularly suitable for applications wherein improved oxygen barrier properties are required and/or where it is desirable to provide a visible display on the interior of the closure cap. As such, the annular injection molded gasket is particularly suitable for such applications, since it leaves the central portion of the panel exposed, enabling use of such area for the display of printed matter and the like.

Figure 14:
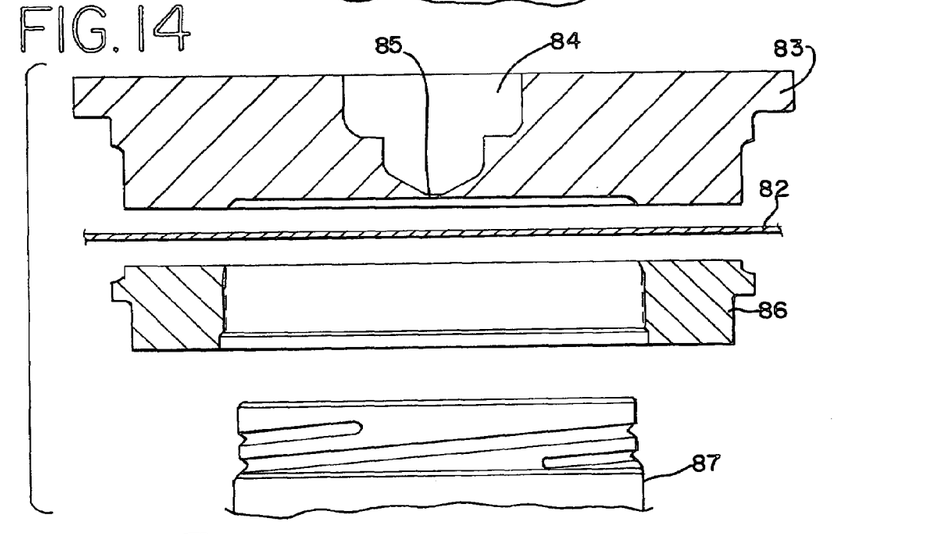
Figure 15:
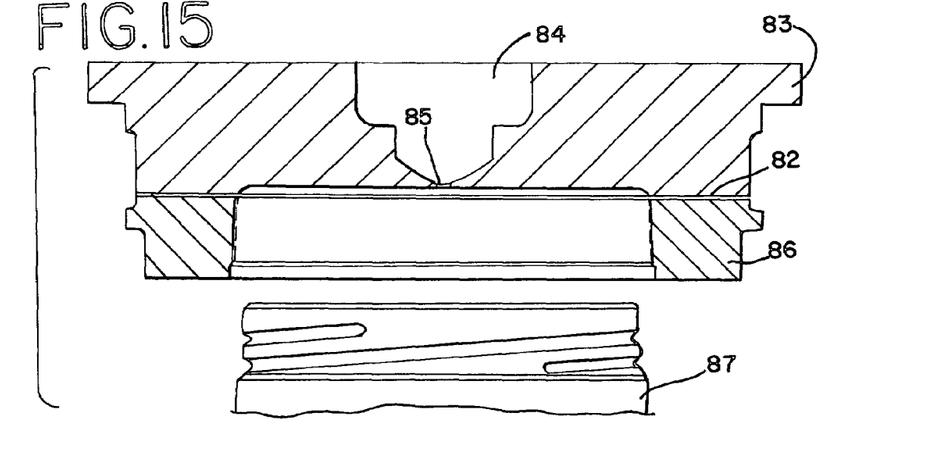
Figure 16:
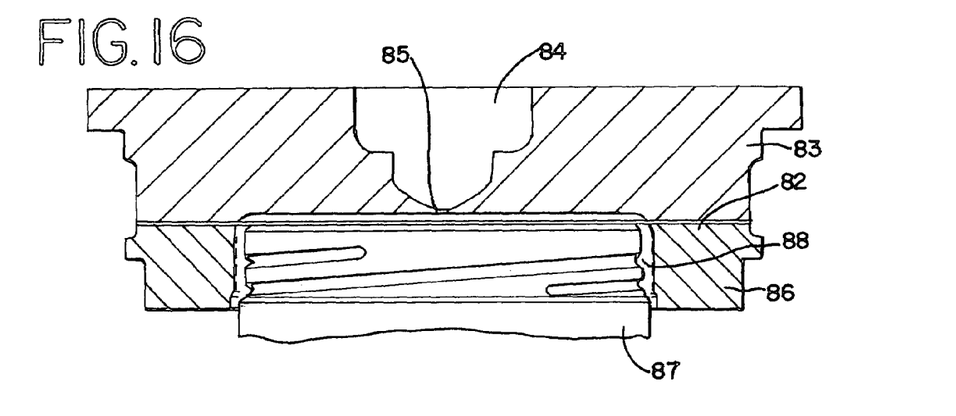

FIGS. 14–18 illustrate one procedure for manufacturing this closure shell. As shown in FIG. 14, a mold apparatus is provided which includes an upper mold component 83 having a melt feed line 84 and gate 85, a lower mold component 86 and a core 87. A sheet or strip of foil or other suitable material which is to be laminated to the interior surface 23 of the closure cap shell is positioned between upper and lower mold components 83, 86. As shown in FIG. 15, these mold components are closed, thereby trapping and securely holding the strip 82 in place.

Figure 17:
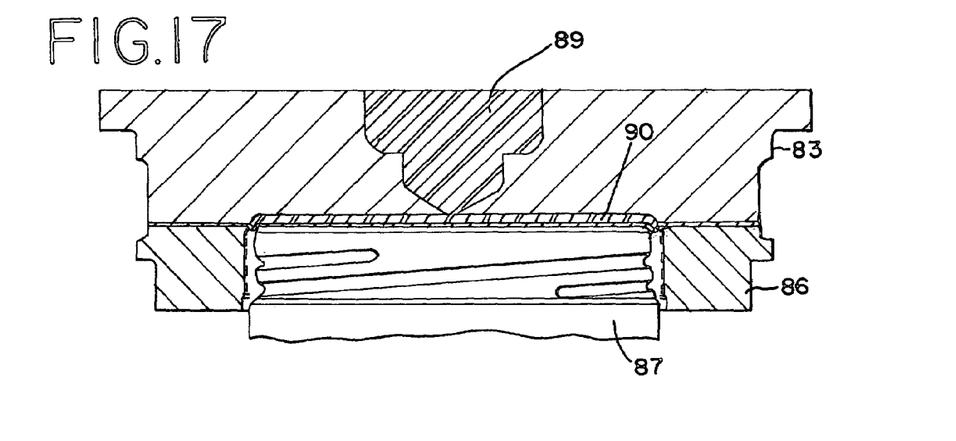
Figure 18:
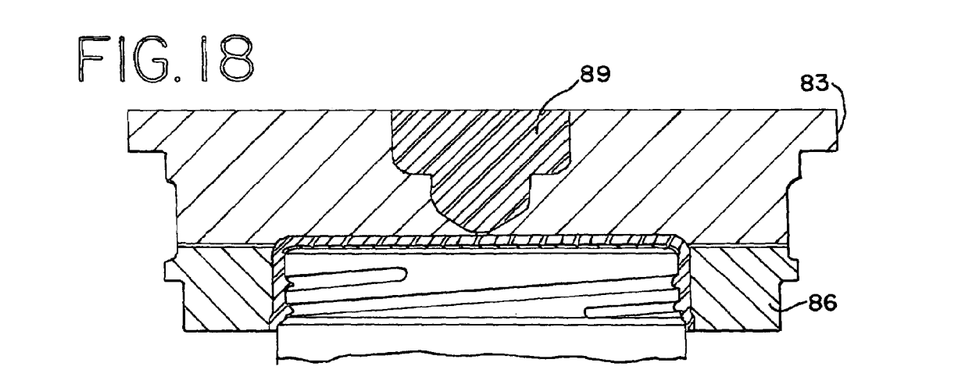

Core 87 is then positioned within lower mold component 86 in direct contact with the strip 82 and defines a mold cavity 88 which corresponds to the configuration of the closure cap to be formed therewith. A supply of melt 89 is then fed into the cavity which, as shown in FIG. 17, forms closure portion 90 and, at the same time, due to the high pressure of the melt feed, breaks the marginal portions of the foil strip and continues to flow as shown in FIG. 18 to form the finished closure shell. The mold portions are then opened and the formed closure cap shell removed therefrom.

While the present invention has been described in connection with the context of various embodiments, it will be apparent to those skilled in this art that modifications and variations may be made therefrom without departing from the sprit and scope of this invention. Accordingly, this invention is to be construed and limited only by the scope of the appended claims.

What is claimed is:

1. A closure cap comprising:
   a shell which includes an end panel and an integral skirt downwardly extending therefrom, said end panel having a generally circular inside surface of a given outer diameter; and,
   an injection molded annular gasket formed directly on the end panel to define a unitary, integral shell and gasket arrangement, said annual gasket having a ring-shaped body which includes an outer edge and an inner edge, said outer edge having a diameter which is less than the outer diameter of said end panel inner surface whereby said outer edge of said gasket body is inwardly spaced from the outer periphery of said end panel inside surface to define a substantially gasket-free annular border which surrounds said ring-shaped gasket body, said gasket having a width sufficient to provide a top seal with an end finish of a container mouth to which said closure is applied, said inner edge of said ring-shaped gasket body surrounding a substantially gasket-free interior portion of said inside surface of said end panel, said gasket also including a first inwardly extending tab of generally uniform cross section formed therewith and a second inwardly extending tab integrally formed therewith, said second tab including an inner-most and an outer-most portion, said inner-most portion having a relatively large cross section with respect to the cross section of said outer-most portion.

2. The closure of claim 1 wherein said first and second tabs extend radially inwardly from the inner edge of said ring-shaped gasket body.

3. The closure cap of claim 2 wherein said first and second tabs are oppositely disposed along the circumference of said ring-shaped gasket body.

4. The closure cap of claim 1 wherein said ring-shaped gasket body includes a top seal-forming surface defined by a plurality of concentric ribs.

5. The closure cap of claim 4 wherein said concentric ribs are conically shaped.

6. The closure cap of claim 1 wherein said gasket is composed of a moldable resin which is substantially free of vinyl chloride.

7. The closure cap of claim 1 wherein said gasket is composed of a thermoplastic elastomer.

8. The closure cap of claim 1 wherein said shell is formed of a moldable thermoplastic resin.

9. The closure cap of claim 8 wherein said thermoplastic resin is a polyolefin.

10. The closure cap of claim 9 wherein said thermoplastic resin is polypropylene.

11. The closure cap of claim 8 wherein said end panel of said shell includes a layer of an oxygen barrier film.

12. The closure cap os claim 11 wherein said layer of oxygen barrier film is adhered to the inside face of said end panel.

13. The closure cap of claim 1 wherein said shell is composed of a metal.

14. A closure cap comprising:
a shell which includes an end panel and an integral skirt downwardly extending therefrom, said end panel having a generally flat, circular inside surface of a given outer diameter; and,
an injection molded annular gasket formed directly on the end panel to define a unitary, integral shell and gasket arrangement, said annual gasket having a ring-shaped body which includes an outer edge and an inner edge, said outer edge having a diameter which is less than the outer diameter of the end panel inner surface thereby providing a substantially gasket-free annular border which surrounds said ring-shaped gasket body, said gasket body having a width sufficient to provide a top seal with an end finish of a container mouth to which said closure is applied, said inner edge of the ring-shaped gasket body surrounding a substantially gasket-free interior portion of the inside surface of said end panel inner surface; said gasket also including first and second tabs extending radially inward from the inner edge of said ring shaped gasket body, said second tab including a first portion adjacent said inner edge of said ring-shaped gasket and a second portion, integrally formed therewith and inwardly extending therefrom.

15. The closure cap of claim 14 wherein said first and second tabs are oppositely disposed along the circumference of said ring-shaped gasket body.

16. The closure cap of claim 14 wherein said ring-shaped gasket body includes a top seal-forming surface defined by a plurality of concentric ribs.

17. The closure cap of claim 14 wherein said concentric ribs are conically-shaped.

18. The closure cap of claim 14 wherein said gasket is composed of a thermoplastic elastomer.

19. The closure cap of claim 14 wherein said shell is formed of a moldable thermoplastic resin.

20. The closure cap of claim 14 wherein said thermoplastic resin is a polyolefin.

21. The closure cap of claim 20 wherein said thermoplastic resin is polypropylene.

22. The closure cap of claim 19 wherein said end panel of said shell includes a layer of an oxygen barrier film.

23. The closure cap of claim 22 wherein said layer of oxygen barrier film is adhered to the inside face of said end panel.

24. The closure cap of claim 14 wherein said shell is composed of a metal.

* * * * *